United States Patent
Gamal et al.

(10) Patent No.: US 6,688,011 B2
(45) Date of Patent: Feb. 10, 2004

(54) MODULAR LASER SYSTEM FOR LEVEL DETERMINATION

(75) Inventors: Albert Gamal, Le Mesnil-le-Roi (FR); Mircea Chiorean, Herblay (FR); Didier Persin, Paris (FR); Roland Franclet, Vaureal (FR)

(73) Assignee: Agatec, Mesnil le Roi (FR)

( * ) Notice: Subject to any disclaimer, the term of this patent is extended or adjusted under 35 U.S.C. 154(b) by 0 days.

(21) Appl. No.: 10/210,867

(22) Filed: Aug. 2, 2002

(65) Prior Publication Data

US 2003/0229997 A1 Dec. 18, 2003

(30) Foreign Application Priority Data

Jun. 18, 2002 (FR) .............................................. 0207648

(51) Int. Cl.[7] .......................... G01B 11/26; G01C 15/02
(52) U.S. Cl. .......................... 33/290; 033/291; 033/281
(58) Field of Search .......................... 33/290, 281, 283, 33/285, 286, 291, DIG. 21

(56) References Cited

U.S. PATENT DOCUMENTS

| | | | | |
|---|---|---|---|---|
| 4,035,084 A | * | 7/1977 | Ramsay | 356/139.08 |
| 5,212,889 A | * | 5/1993 | Lysen | 33/286 |
| 5,636,018 A | * | 6/1997 | Hirano et al. | 356/248 |
| 6,014,211 A | | 1/2000 | Middleton et al. | 356/250 |
| 6,035,540 A | * | 3/2000 | Wu et al. | 33/286 |
| 6,568,094 B2 | * | 5/2003 | Wu | 33/281 |

FOREIGN PATENT DOCUMENTS

| | | |
|---|---|---|
| BE | 683 422 | 12/1966 |
| EP | 0 806 630 | 11/1997 |
| GB | 1156072 | 6/1969 |

* cited by examiner

Primary Examiner—Christopher W. Fulton
(74) Attorney, Agent, or Firm—Lowe Hauptman Gilman & Berner, LLP (57) ABSTRACT

A modular laser level determination system includes a laser beam generator in a housing, fixed to a positioner. The laser beam is oriented towards a central shaft inside the housing that is not closed off by any obstacles and passes through a collimator. A rotation drive module of an optical assembly comprises at least one reflection plane. The rotation drive module extends in a direction coaxial with the center line of the laser beam. The rotation drive module comprises a brushless motor with electronic switching, a hollow shaft, and a stator fixed to an element fixed in rotation. The stator can be tilted by a module for determination and adjustment of the inclination with respect to a reference place. The laser beam generator is fixed to the brushless motor.

20 Claims, 5 Drawing Sheets

MODULAR LASER SYSTEM FOR LEVEL DETERMINATION

FIELD OF THE INVENTION

This invention relates to the domain of level determination instruments. The invention more particularly relates to a modular laser type level determination system.

BACKGROUND OF THE INVENTION

In general, level determination instruments are used in construction, for example for the construction of a horizontal surface fixed on columns or sidewalls, for levelling ground or for making measurements by a surveyor.

Instruments according to prior art, e.g., as disclosed in U.S. Pat. No. 6,014,211, usually comprise a housing with a base in which a laser source is installed that sends an upwards vertical beam towards a rotating pentaprism, e.g., pentaprism 20 of the '211 patent. The rotating pentaprism then redirects the vertical beam at an angle equal to approximately 90° to scan a horizontal light levelling plane. Under some conditions, these instruments cannot be placed horizontal and they are then arranged on inclined planes. To solve this defect, levels have been added to compensate for this type of inclination.

The prior art of U.S. Pat. No. 6,014,211 discloses a device generating a laser levelling plane. The device of the '211 patent includes a housing containing a horizontal laser beam generator and a mirror placed in a vertical tube, installed on tope of a rotating motor assembly that rotates a pentaprism. With this type of device, it is impossible to make a fine adjustment of the orientation of the various elements such as the motor, the laser beam generator, the tube carrying the laser beam, these elements are relatively dispersed. The reliability of this device is significantly reduced because there is no integration between the different components. Furthermore, this type of device with a wire suspended pendulum may not be sufficiently robust to resist difficult conditions on site.

OBJECTS AND SUMMARY OF THE INVENTION

Therefore, the purpose of this invention is to overcome one or several of the disadvantages of prior art by defining a high precision and reliable modular laser type level determination system that integrates the motor driven module and levelling elements and the laser source in the same housing.

This objective is achieved by means of a modular laser level determination system comprising a laser beam generator in a housing, fixed with means of positioning with respect to a plane parallel to the plane of the base of the said housing, the laser beam being oriented towards a central shaft inside the housing not closed off by any obstacles and firstly passing through collimation means, a rotation drive module of an optical assembly comprising at least one reflection plane, the said rotation drive module being arranged along a direction approximately coaxial with the centre line of the laser beam, characterized by the fact that the rotation drive module of the said optical assembly comprises a brushless electronic switching motor with a hollow shaft, the stator of which is fitted to an element fixed in rotation about an axis parallel to the axis of the laser beam and that can be tilted by a module for determination and adjustment of the inclination with respect to a reference plane parallel to the support plane of the enclosure of the housing, the said laser beam generator being fixed to the brushless motor.

According to another feature of the invention, the said brushless motor comprises a wound stator, a rotor with a permanent magnet and an optical encoder connected to the rotor through the hollow shaft of the motor, the said optical incremental encoder associated with electronic means for detection of the rotor position being used to determine the precise position of the rotor, the position of the laser beam and to check rotation or oscillations between two motor positions.

According to another feature of the invention, the said electronic means for detection of the rotor position comprise at least one encoder position detection and motor control electronic card.

According to another feature of the invention, the said inclination determination and adjustment module comprises manual means of adjusting the inclination of the said element fixed in rotation.

According to another feature, the said inclination determination and adjustment module comprises a device with at least two mechanisms for levelling the said element fixed in rotation, these levelling mechanisms including particularly a micro-motor used to fix at least one screw screwed along a vertical axis of the housing.

According to another feature, the said inclination determination and adjustment module comprises a device with two jacks fixed to two corners of the said element fixed in rotation and the said rotation drive module, the two jacks being used to make a relative displacement of the axis of inclination of the said rotation drive module with respect to the vertical axis of the housing.

According to another feature, the said jacks are electric, these jacks being controlled through at least one electronic control card.

According to another feature, two levels perpendicular to each other and located in a plane parallel to the plane of the base on which the mounting base of the housing is supported are incorporated in a body including the laser beam generator, the direction of the laser beam being oriented with respect to the said base plane, these two levels detecting the relative position of the laser beam generator with respect to a reference plane.

According to another feature, a third "vertical" level perpendicular to the other two levels is built into the body that includes the laser beam generator to detect the relative position of the laser beam generator with respect to a reference plane.

According to another feature, the levels built into the laser beam generator are electronic level vials with optical reading, the optical reading being made using at least one electronic card.

According to another feature, the said inclination determination and adjustment module of the element fixed in rotation comprises a printed circuit, photodetectors and actuator means to determine the inclination of this module with respect to the mounting base of the housing.

According to another feature, the said rotating optical assembly comprises a rotating pentaprism, the laser beam generator equipped with a laser diode being aligned with the said hollow shaft and the said pentaprism along an axis depending on the verticality of the housing, the said pentaprism being oriented to reflect the laser beam by an angle of approximately 90°.

According to another feature, the said positioning means with respect to a plane parallel to the mounting base plane of the said housing comprise at least one manually adjustable screwing element.

According to another feature, the said positioning means with respect to a plane parallel to the mounting base plane of the said housing comprise at least one electric jack.

According to another feature, the system according to the invention comprises a double slope device, each slope being formed particularly by two plates, at least one of these plates being mobile and articulated through at least two balls, the two balls forming a generating line of a plane and being acted upon along another generating line of this plane by an elastic means towards a return position and in the other direction by electromagnetic equipment for adjusting the slope.

According to another feature, one of the plates in the double slope device is common to the two slopes.

According to another feature, the mobile plates of the double slope device are installed free to pivot about the said two balls, the rotation axes of the mobile plates being oriented perpendicular to each other.

According to another feature, the said electromechanical equipment comprises at least two stepping motors managed by electronic control means taking account of representative values of rotation angles of the mobile plates input by the user on an interface and at least one correction table.

According to another feature, the system according to the invention comprises a single slope device positioned between the said brushless motor (5) and the location of the levels (30, 31).

According to another feature, the housing comprises gripping means and a recess for use by a battery closed by a removable cover, a console with a display screen and control buttons being associated with the said housing particularly to control the said inclination determination and adjustment module and the encoder position detection and motor control electronic card.

The invention and its features and advantages will be more clearly understood after reading the description made with reference to the appended drawings given as non-limitative examples.

DESCRIPTION OF THE PREFERRED EMBODIMENT

Figure 2:
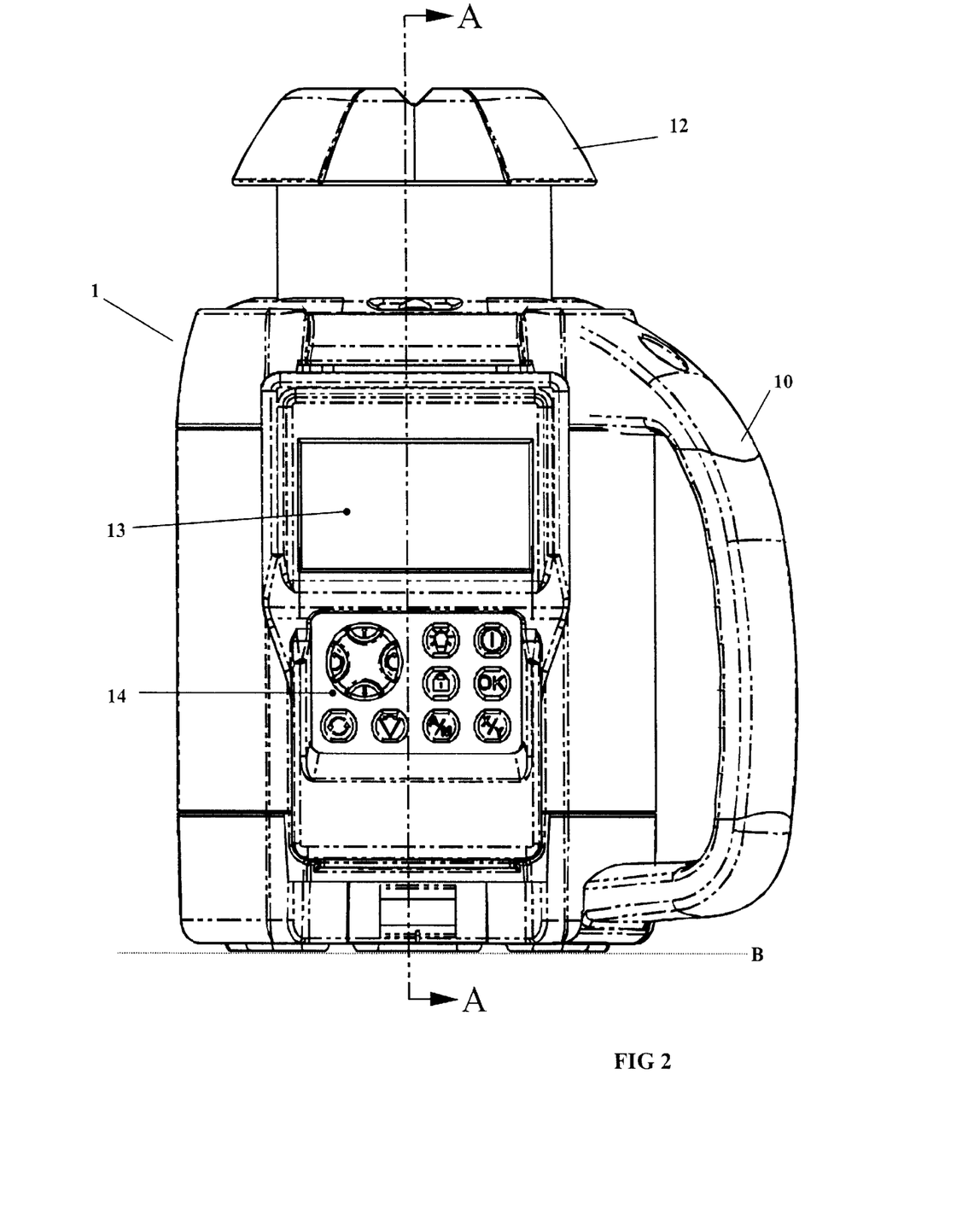
FIG. 2 shows the housing of the system according to the invention, FIG. 3 diagrammatically shows the system according to the invention, when in use, FIG. 4 diagrammatically shows an automatic levelling device used in the invention.
Figure 3:
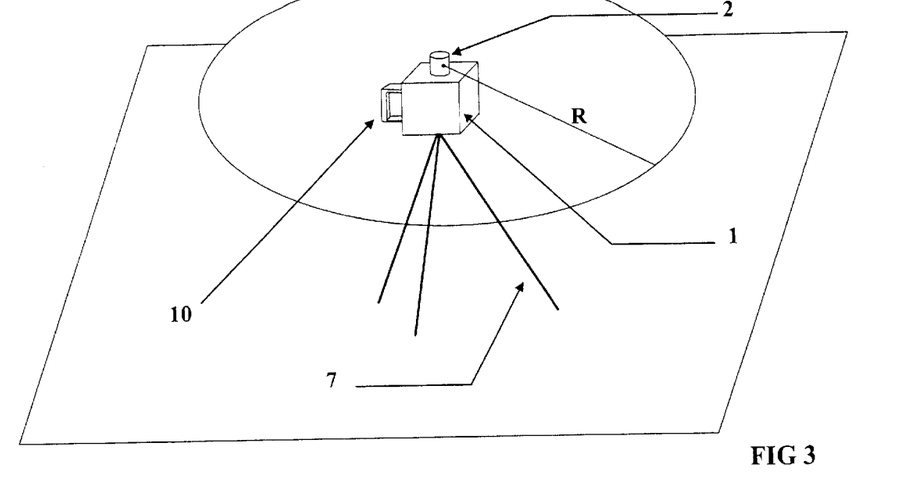

The invention will now be described with reference to FIGS. 1, 2 and 3. The modular laser level determination system comprises firstly a fixed housing (1) that contains a laser beam generator, a central shaft without obstacles in which the said beam passes and a motor driven module (5) driving a hollow shaft (51) in rotation, one end of which projects outside the said housing (1), and secondly a mobile head (2) fixed to the projecting end of the hollow shaft (51) driven in rotation that comprises an optical assembly reflecting the laser beam output from the module or body (3) containing the laser source. As shown in FIG. 2, the housing (1) may comprise a dome (12) that protects the mobile head (2) from shocks. The system according to the invention is particularly suitable for radii of action (R) of the laser varying between 0 and 150 m. The housing (1) may be metallic or cast from a plastic material and equipped with gripping means (10) such as one or several handles, cavities for passing fingers, etc. The housing (1) may include a recess in which a battery (100) will be installed and closed by a removable cover. The rechargeable batteries used are 2.4 or 4.8 V. The modular system according to the invention is compact, with dimensions less than one meter, and may easily be installed on a tripod (7) or other similar support means during use. Its weight does not exceed 3.5 kg.

Figure 1:
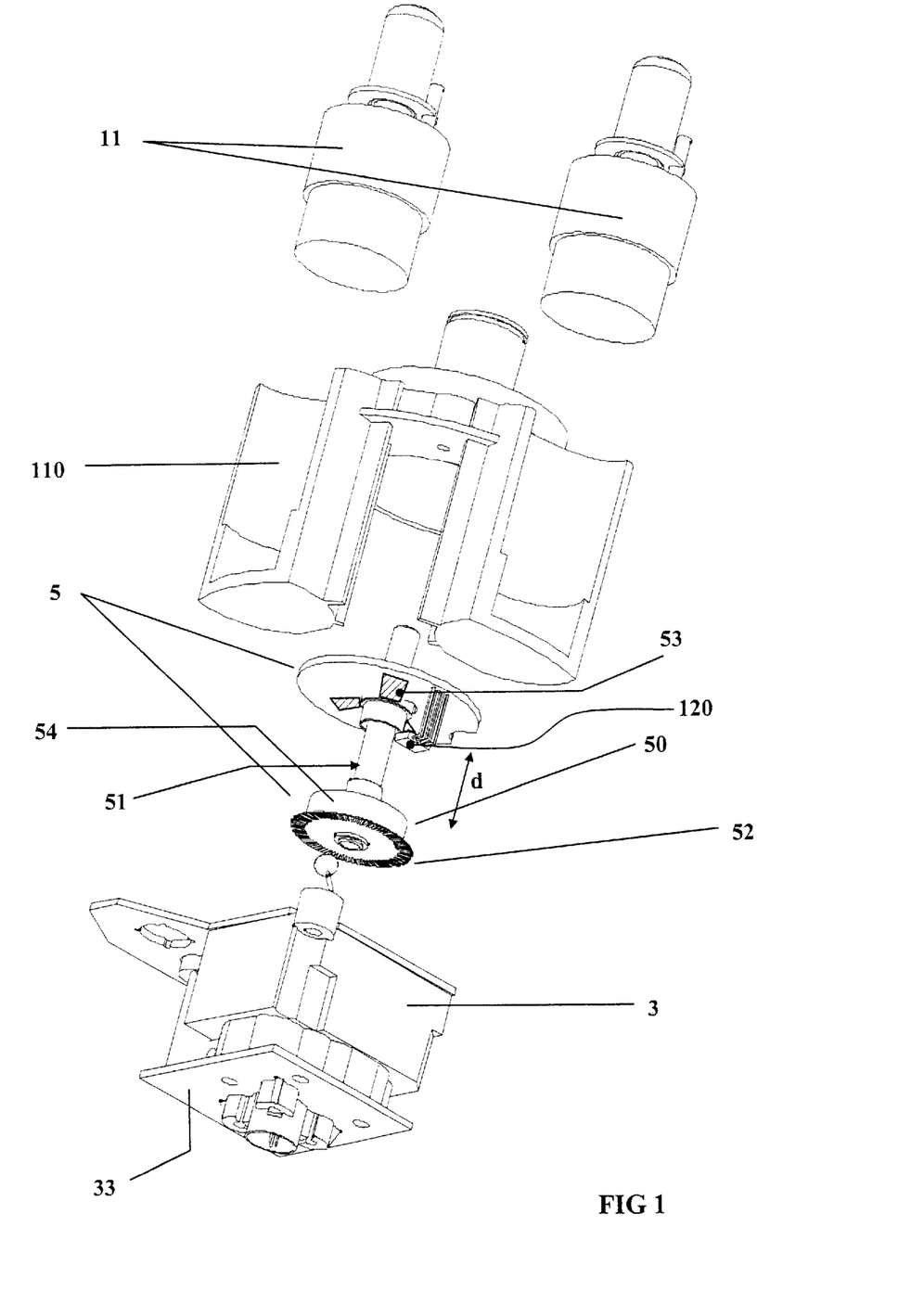
FIG. 1 shows an exploded perspective view of a variant embodiment of the contents of the housing.
Figure 4:
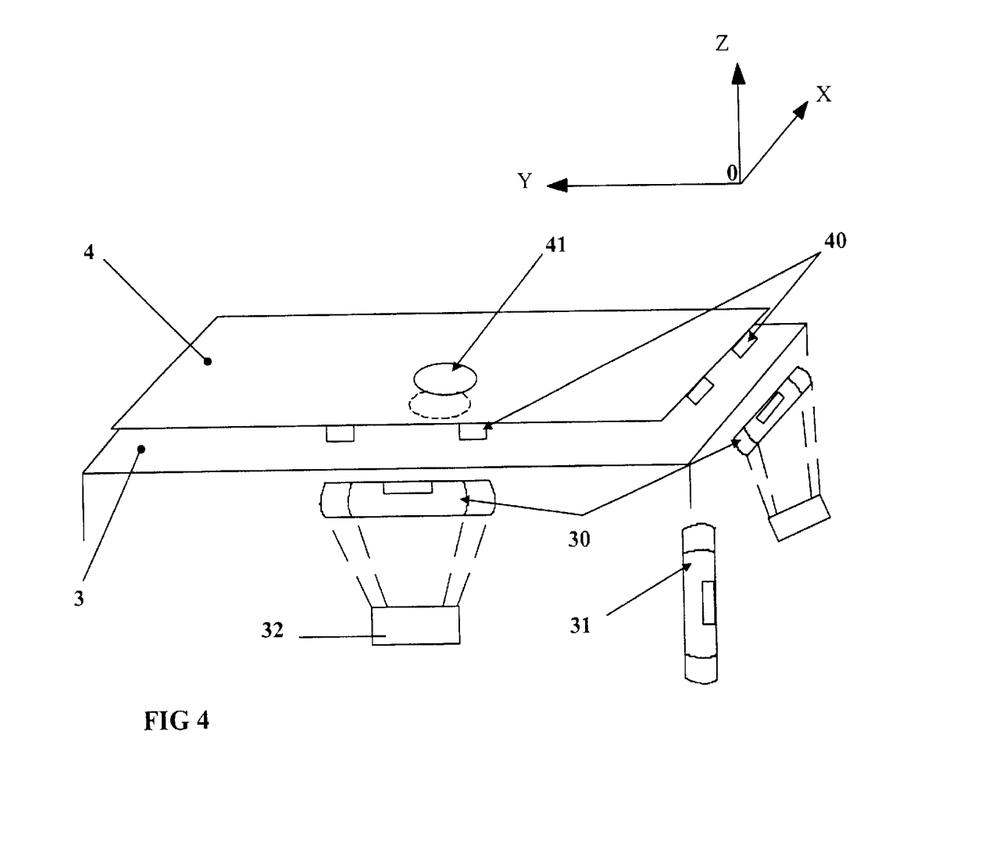

As illustrated in FIG. 1, the laser beam generator is positioned almost at one end of the housing (1), the hollow shaft (51) including a projecting part (not shown) that projects outside the housing (1) at the other end. In one embodiment of the invention, the said laser beam generator may be fixed to the positioning means with respect to a plane parallel to the base plane (B) of the housing (1). For example, these positioning means may be one or several fixing screws fixed to the base (33) of the body (3) that integrates the said laser beam generator or at least one adjustable electrical jack. The laser beam generator may be a standard equipment with a laser diode, for example radiating at a wavelength of 635 nm and a power of about 1 mW. The said body (3) also contains levels (30, 31) that are shown in FIG. 4. After the levelling or calibration phase that positions the axis of the laser beam orthogonally with respect to the base (33) of the body (3) supporting in particular the said levels (30, 31), the laser beam is aligned with the central shaft of the housing (1) and the said motor driven module (5).

The motor driven module (5) is a module that drives the hollow shaft (51) to which the mobile head (2) is fixed, in rotation. More precisely, it is a brushless motor with electronic switching comprising a wound stator (53) and a rotor with permanent magnet (50) including the said hollow shaft (51). In the preferred embodiment of the invention, and non restrictively, the motor driven module (5) also comprises an incremental optical encoder (52) that can precisely define the angular position of the rotor (50) and therefore the laser beam reflected by the pentaprism (20) of the mobile head (2). The rotor (50) comprises a ring (54) in which at least one permanent magnet is placed. Switching, in other words successively changing the power supply poles of the coils of the stator (53) creates a rotating field that drives the rotor (50) in rotation. The ring (54) comprises signalling elements that may be detected by optoelectronic sensors of the optical encoder (52). These signalling elements may be a disk comprising opaque zones and translucid zones placed on the optical encoder (52) used to determine the position of the rotor (50) by means of a photodetector (120) illuminated by a light emitting diode. In this embodiment, the said ring (54) is parallel to the optical encoder (52) that is circular in shape and is placed at a distance (d) of a few centimetres, for example 3 cm. The diameter of the ring (54) of the rotor (50) may for example vary from 20 to 40 mm. The optical encoder (52) is coupled to electronic means for detection of the position of the rotor (50) to check rotation or oscillations between two positions of the motor. These electronic means to which the optical encoder (52) is coupled comprise at least one electronic card for detection of the position of the said encoder (52) and to control the motor driven module (5). In other variants, the motor driven module (5) may not be provided with an optical encoder (52), in order to simplify the equipment. Several motors may be used in combination to generate several laser planes at the same time.

The mobile head (2) with optical assembly comprises at least one reflection plane to reflect the laser beam at an angle equal to approximately 90°. In the preferred embodiment of the invention, the said mobile head (2) comprises a rotating pentaprism (20) that follows the rotation of the hollow shaft (51).

In one variant embodiment, an "upper" module (110) located above the motor driven module (5) comprises two axes hinged to each other by means of a perforated universal joint to avoid closing the central shaft through which the laser beam passes. The wound stator (53) is fixed to an element fixed in rotation about an axis parallel to the axis of the laser beam. This element can be inclined by a module for determination and adjustment of the inclination with respect to a reference plane strictly parallel to the bearing plane of the enclosure of the housing (1). This element may for example be the said upper module (110). In the embodiment shown in FIG. 1, level vials are inserted in a body (3) that contains the laser beam generator and that act on adjustment means to define a strictly horizontal reference plane and a strictly vertical reference plane. The said inclination determination and adjustment module may comprise a system with two jacks (11) to adjust the inclination of the said upper module (110). When the base of the housing (1) is placed on a bearing surface, the inclination used will be the inclination with respect to a strictly horizontal reference plane determined by at least two level vials said to be horizontal. When the housing (1) is laid down on one side, the inclination with respect to a strictly vertical plane will always be used, this horizontal plane being determined by one of the "horizontal" level vials, and a "vertical" level vial. Recesses along which the jacks (11) fixed to the stator (53) pass can act as the said element fixed in rotation. The jacks (11), which may for example be electric, apply contact pressure through elastic return means, to the upper wall of the housing (1) or similar bearing surfaces that are fixed. If the housing (1) is fixed upright supported on the base on an approximately horizontal floor, the two jacks (11) enable relative displacement of the axis of inclination of the stator (53) with respect to a reference axis of the system which is an axis perpendicular to the bearing plane of the housing (1). The laser beam generator remains fixed to the stator (53) when the stator is inclined. The jacks (11) may be automatically controlled through at least one electronic control card. In another variant embodiment, the system adjusting the inclination of the motor (5) may also be manual, for example using directly read level vials that can be seen by the user.

In the variant embodiment shown in FIG. 2, the housing (1) comprises an interface between the user and the system according to the invention. This interface comprises a display screen (13) and control buttons (14). The user uses this interface for example to adjust parameters such as the rotation speed of the mobile head (2) or the inclination of the laser plane to be scanned by the system. The system according to the invention may also comprise a console with a display screen and control buttons, for example to control the said inclination determination and adjustment module. This type of console can also be used to control the electronic card that detects the position of the encoder (52) and controls the motor (5).

The invention will now be described with reference to FIG. 4.

In one embodiment of the invention, the laser beam generator is incorporated in a module for determination of the inclination composed of a body (3) that also integrates two or three levels (30, 31) used for detection of the level in a horizontal and vertical plane. As illustrated in FIG. 3, the laser source may be positioned precisely by means of two levels (30) positioned in two perpendicular directions (OX, OY) and located in a plane that can be rotated with respect to the bearing plane on which the mounting base of the housing (1) is supported. The orientation of the laser beam, refined due to these two levels (30), must be perpendicular to the reference plane defined by these levels (30). These two levels (30) detect the relative position of the laser beam generator with respect to this reference plane. A third level (31) said to be vertical and perpendicular to the other two planes may be incorporated into the body (3) containing the laser beam generator.

In the preferred embodiment of the invention, these levels (30, 31) incorporated into the body (3) containing the laser beam generator are electronic level vials with optical readout. This optical readout may for example be made using at least one electronic card (4). The electronic readout card (4) may comprise photodetectors placed facing electronic level vials with optical readout. The electronic readout card (4) is placed on top of the body (3) of the laser beam generator and comprises a central orifice through which the said beam can pass. This card (4) may comprise means of controlling adjustable electrical jacks (11) or other inclination compensation means with servocontrol motor for positioning and orienting the laser source very precisely. A strictly horizontal laser beam can thus be generated, for example if the housing (1) is positioned on a bearing plane through its mounting base. The laser beam is produced after collimation of this laser source, using at least one collimation lens.

Another variant of the invention will now be described with reference to FIGS. 5, 6 and 7.

Figure 5:
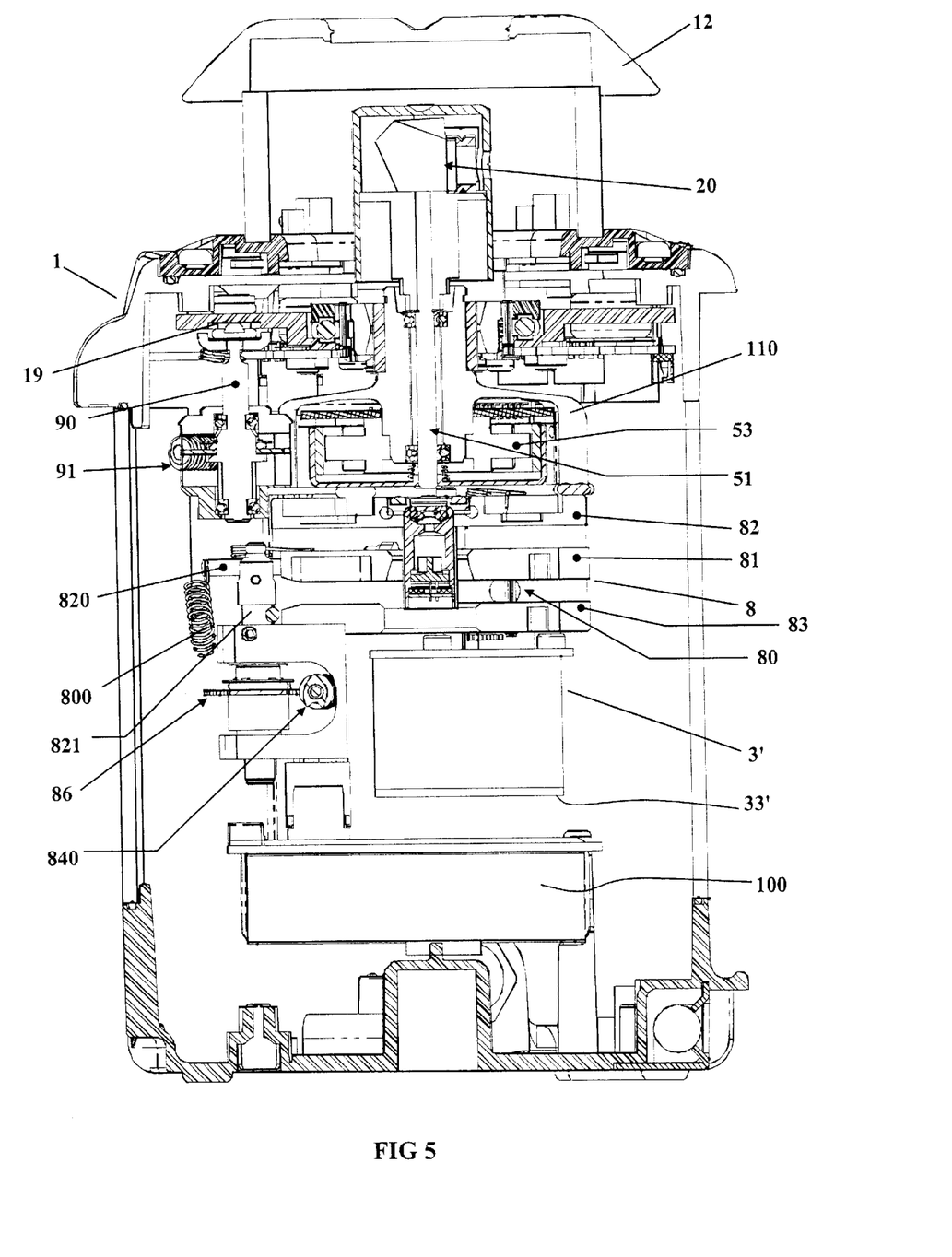
FIG. 5 shows a sectional view of a variant embodiment with a double slope device.

FIG. 5 is a sectional view along plane AA in FIG. 2. On the embodiment illustrated in FIG. 5, a single or double slope device (8) is added and separates the rotation module (5) located on top, from the level vials level determination block (3') located underneath. As illustrated in FIG. 6, the double slope device (8) comprises a base support plate (83), a mobile upper plate (82) and a mobile lower plate (81). One of the plates (81) of the double slope device (8) is common to the two slopes. A first slope is formed between the base support plate (83) and the lower plate (81) and a second slope is formed between the lower plate (81) and the upper plate (82). The upper plate (82) is supported on two balls (80) that form a first axis and the lower plate (81) is supported on two balls (80) that form a second axis perpendicular to the first. In one embodiment of the invention, the two axes formed by the balls (80) are offset from the centre of the plates (81, 82). Each of the plates (81, 82) comprises a projecting handle (810, 820) approximately parallel to the plane of the plates (81, 82). Each handle (810, 820) is acted upon by jacks or pushers (811, 821) through elastic return means (800) such as springs. These jacks or pushers (811, 821) form part of an electromechanical device controlled by information input by the user from the interface. In the embodiment shown in FIG. 6, the jacks or pushers (811, 821) push the handles (810, 820) of the mobile plates (81, 82) articulated by two balls (80), vertically upwards. More generally, for each plate (81, 82), the two balls (80) form a generating line of a plane and are acted upon along another generating line of this plane by the said elastic return means (800) to bring them towards the return position, and by the pushers (811, 821) in the other direction. The base support (83) of the double slope device (8) is fixed to a level determination block (3') that includes the level vials. The upper plate (82) is fixed to the brush motor (5) and also in one embodiment of the invention, to the laser beam generator. The pushers (811, 821) used in the double slope device (8) may be moved using stepping micro-motors (84). For example, these micro-motors may turn a worm screw (840) driving a toothed wheel (86) to very gradually raise or lower the said pushers (811, 821). A single slope device comprising a single mobile plate on two balls and a support plate may replace the double slope device (8).

The uncentred arrangement of the balls (80) in the double slope device (8) makes it possible to reduce the size of the mobile plates (81, 82). For example, the diameter of these plates (81, 82) may be of the order of ten centimetres. Inevitable errors in the slope angle inherent to this type of device are corrected by means of correction factors input in a correction table. This correction table is stored in the memory of an electronic card that manages the said electromechanical equipment. With this type of device (8), the inclination of the rotation module (5) with respect to the strictly horizontal or vertical plane defined by the level vials is made very precisely. The interface between the user and the system according to the invention comprises means of inputting the two required values of the angle corresponding firstly to an angle of rotation of the lower plate (81) about a first axis formed by two balls (80) and secondly to the angle of rotation of the upper plate (82) about a second axis formed by two other balls (80) and orthogonal to the first axis. The electronic card that manages the said electromechanical equipment comprises means of reading the correction factors. These correction factors related to the geometry of the system are used by the electronic card that manages the electromechanical equipment. This inclination may be adjusted to +/−6° with a slope error not exceeding 0.01%. Thus, for a 100 m radius scanned by the system according to the invention, the error will be not more than 1 cm.

In embodiments with a double slope device (8), the said positioning means fixed to the laser beam generator to make the initial adjustment to the laser beam to make it upright in the housing (1) when the instrument is being made, may for example consist of screwing/fixing elements fixed to the level vials (3'), for example to the base (33') of this block (3'). The said upper module (110) comprises two axes hinged to each other by means of a universal joint with a perforated cross piece to avoid closing off the central shaft through which the laser beam passes. The cross piece maintains directional precision in the variant with a double slope device (8).

Figure 6:
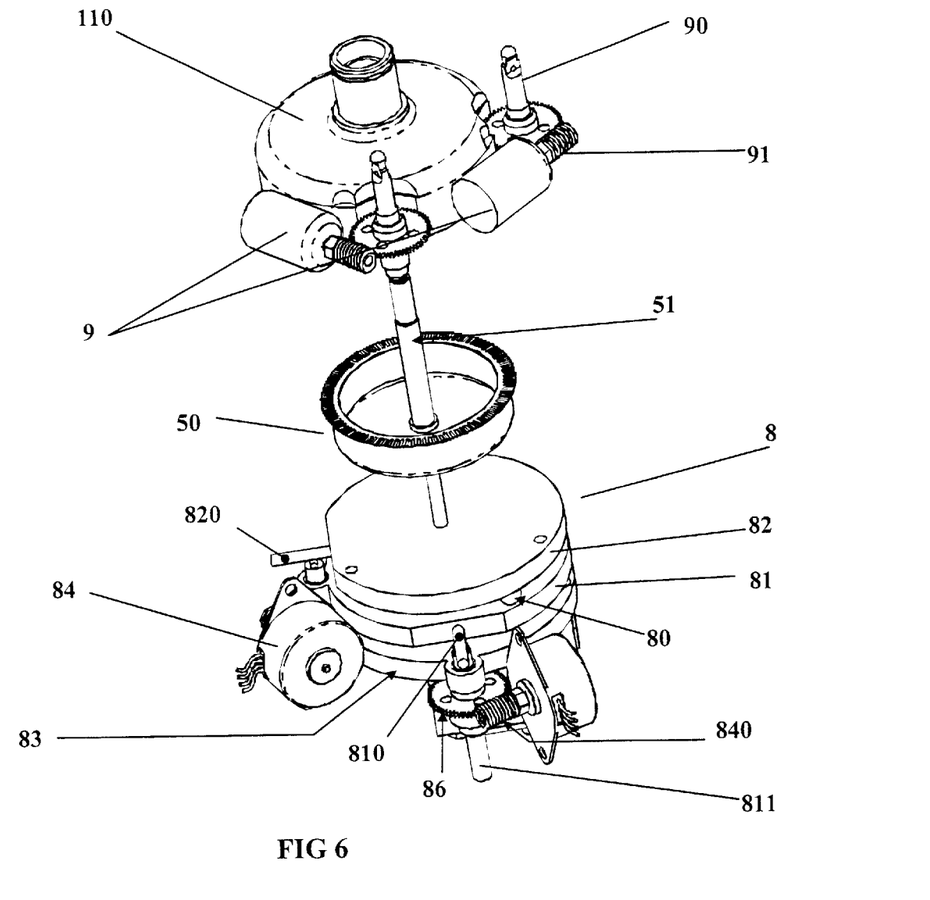
FIG. 6 shows an exploded perspective view of a variant embodiment of the contents of the housing.
Figure 7:
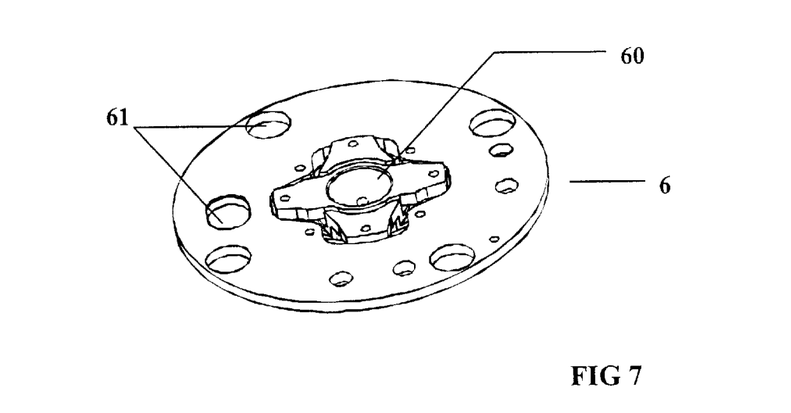
FIG. 7 shows the circular plate acting as a fixed element for fixing the stator.

In the embodiment shown in FIG. 6, the module for determination and adjustment of the inclination with respect to a reference level given by the level vials comprises levelling devices fixed to the rotation drive module of the mobile head (2). These levelling devices are composed particularly of micro-motors (9) with worm screws (91), each of which drives a micrometric screw (90). For example the micrometric screws (90) come into contact with fixed contact surfaces (19) of the housing (1) according to a vertical axis of the housing (1). By adjustment of the micrometric screws (90), these levelling devices incline an element fixed in rotation and fixed to the stator (53) of the motor (5). For example, the stator (53) is supported on a fixed plate (6) of the housing (1). The junction (60) between this fixed plate (6) and the stator (53) enables inclination of the stator (53) by at least 6° with respect to the alignment corresponding to verticality of the housing (1), in all directions. This plate (6) comprises orifices (61) in which reinforcement elements of the housing (1) are located.

FIGS. 5 and 6 show a double slope embodiment with three flat plates (81, 82, 83). When the housing is bearing on its mounting base, the instrument according to FIG. 5 or 6 is used firstly to search for verticality by the laser generator inclination determination and adjustment module, particularly using the level vials (3') block and the levelling devices. Then secondly, this instrument is used for relative inclination of the rotation module (5) and the beam generator with respect to the level determination block (3') by varying the angle or the angles of the inclination of at least one mobile plate (81, 82).

One of the advantages of the invention is the integration of components of the level determination system and the robustness obtained compared with instruments with more delicate instrumentation. The housing (1) includes an approximately aligned module to generate a laser beam vertical with respect to the housing (1). Furthermore, the resulting precision is very high due to the use of level vials to correct any inclination error.

It must be obvious for persons experienced in the subject that this invention can be used with many embodiments in many other specific forms without going outside the scope of the invention as claimed. Consequently, these embodiments must be considered as illustrations but may be modified within the domain defined by the scope of the attached claims, and the invention must not be limited to the details given above.

What is claimed is:

1. Modular laser level determination system comprising a laser beam generator in a housing, fixed with means of positioning with respect to a plane parallel to the base plane of the said housing, the laser beam being oriented towards a central shaft inside the housing not closed off by any obstacles and firstly passing through collimation means, a rotation drive module of an optical assembly comprising at least one reflection plane, the said rotation drive module being arranged along a direction approximately coaxial with the center line of the laser beam, the rotation drive module of the said optical assembly comprising a brushless motor with electronic switching and a hollow shaft, the motor including a stator that is (a) fixed to an element fixed in rotation about an axis parallel to the axis of the laser beam and (b) can be tilted by a module for determination and adjustment of the inclination with respect to a reference plane parallel to the bearing plane of the enclosure of the housing, the said laser beam generator being fixed to the brushless motor.

2. Modular laser level determination system according to claim 1, in which the said brushless motor comprises a wound stator, a rotor with a permanent magnet and an optical encoder connected to the rotor through a hollow shaft of the motor, the said optical incremental encoder being associated with an electronic arrangement for detection of the position of the rotor for (a) determining (i) the precise position of the rotor, (ii) the position of the laser beam and (b) checking rotation or oscillations between two positions of the motor.

3. Modular laser level determination system according to claim 2, in which the said electronic arrangement for detection of the position of the rotor comprises at least one electronic card to detect the position of the optical encoder and to control the motor.

4. Modular laser level determination system according to claim 1, in which the said inclination determination and adjustment module comprises manual mechanism for adjusting the inclination of the said element in fixed rotation.

5. Modular laser level determination system according to claim 1, in which the said inclination determination and adjustment module comprises a device with at least first and second mechanisms for levelling the said element fixed in rotation, the at least first and second levelling mechanisms including a micro-motor for fixing at least one screw screwed along a vertical axis of the housing.

6. Modular laser level determination system according to claim 1, in which the said inclination determination and adjustment module comprises a device having to jacks fixed to two corners of the said element fixed in rotation and the said rotation drive module, the two jacks being arranged to cause relative displacement of the axis of the inclination of the aid rotation drive module with respect to the vertical axis of the housing.

7. Modular laser level determination system according to claim 6, in which the said jacks are electric, the jacks being arranged to be controlled through at least one electronic control card.

8. Modular laser level determination system according to claim 1 further including two levels perpendicular to each other and located in a plane parallel to the base plane on which the mounting base of the housing is supported are incorporated in a body including the laser beam generator, the direction of the laser beam being oriented with respect to the said base plane, the two levels being arranged for detecting the relative position of the laser beam generator with respect to a reference plane.

9. Modular laser level determination system according to claim 8, wherein the body that includes the laser beam generator includes a third vertical level perpendicular to the other two levels, the third level being arranged to detect the relative position of the laser beam generator with respect to a reference plane.

10. Modular laser level determination system according to claim 8 in which the levels built into the laser beam generator are electronic levels with optical reading, the optical reading to be made with at least one electronic card.

11. Modular laser level determination system according to claim 8, further comprising a single slope device positioned between the brushless motor and the location of the levels.

12. Modular laser level determination system according to claim 1, in which the said inclination determination and adjustment module of the element fixed in rotation comprises a printed circuit, photodetectors and an actuator arrangement to determine the inclination of this module with respect to the mounting base of the housing.

13. Modular laser level determination system according to claim 1 in which the said rotating optical assembly comprises a rotatable pentaprism, the laser beam generator equipped with a laser diode being aligned with the said hollow shaft and the said pentaprism having an optical axis along an axis depending on the verticality of the housing, the said pentaprism being oriented to reflect the laser beam by an angle of approximately 90°.

14. Modular laser level determination system according to claim 1, in which the said positioning means with respect to a plane parallel to the base plane of the said housing comprise at least one manually adjustable screwing element.

15. Modular laser level determination system according to claim 1 further including a positioning arrangement with respect to a plane parallel to the base plane of the said housing comprising at least one electric jack.

16. Modular laser level determination system according to claim 1 further comprising a double slope device, each slope being formed by two plates, at least one of these plates being mobile and articulated through at least balls, the two balls forming a generating line of the plane by an elastic structure towards a return position and in the other direction by electromagnetic equipment for adjusting the slope inclination.

17. Modular laser level determination system according to claim 16, in which one of the plates in the double slope device is common to the two slopes.

18. Modular laser level determination system according to claim 16, in which the mobile plates of the double slope device are free to pivot about the said two balls, the rotation axes of the mobile plates being oriented perpendicular to each other.

19. Modular laser level determination system according to claim 16, in which the said electromagnetic equipment comprises at least two stepping motors coupled to be responsive to an electronic controller taking account of representative values of rotation angles of the mobile plates input by the user on an interface and at least one correction table.

20. Modular laser level determination system according to claim 1, in which the housing comprises gripping means and a housing for containing a battery adapted to be closed by a removable cover, a console with a display screen and control buttons associated with the said housing for controlling the said inclination determination and adjustment module and the electronic card to detect the position of the encoder and to control the motor.

* * * * *